United States Patent
Vendrow et al.

(10) Patent No.: US 9,008,625 B2
(45) Date of Patent: Apr. 14, 2015

(54) FRAUD PREVENTION TECHNIQUES

(71) Applicant: RingCentral, Inc., San Mateo, CA (US)

(72) Inventors: Vlad Vendrow, Redwood Shores, CA (US); Bruce Young, San Jose, CA (US); Praful Shah, Los Altos Hills, CA (US); Boris Elpiner, Sunnyvale, CA (US); Vladimir Shmunis, South Lake Tahoe, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 14/043,380

(22) Filed: Oct. 1, 2013

(65) Prior Publication Data
US 2014/0031009 A1    Jan. 30, 2014

Related U.S. Application Data

(63) Continuation of application No. 12/626,066, filed on Nov. 25, 2009, now Pat. No. 8,588,744.

(60) Provisional application No. 61/118,409, filed on Nov. 26, 2008.

(51) Int. Cl.
*H04M 3/16*        (2006.01)
*H04W 12/12*    (2009.01)
(Continued)

(52) U.S. Cl.
CPC ............ *H04W 12/12* (2013.01); *G06Q 20/32* (2013.01); *G06Q 20/4016* (2013.01);
(Continued)

(58) Field of Classification Search
USPC ................................. 455/410–411, 418–420
See application file for complete search history.

(56) References Cited

U.S. PATENT DOCUMENTS 7,433,855 B2    10/2008    Gavan et al.
7,610,040 B2 *  10/2009    Cantini et al. ............... 455/410
(Continued)

FOREIGN PATENT DOCUMENTS

KR    10-2000-0023675    4/2000
KR    10-2002-0086695    11/2002

OTHER PUBLICATIONS

Authorized Officer Jae Gwi Choi, Notification of Transmittal of the International Search Report and the Written Opinion of the International Searching Authority, or Declaration for Application No. PCT/US2009/065976, dated Jun. 24, 2010, 11 pages.
(Continued)

*Primary Examiner* — Brandon Miller
(74) *Attorney, Agent, or Firm* — Fish & Richardson P.C.

(57) ABSTRACT

System, apparatus, computer program products and methods for preventing fraud attacks (e.g., on a virtual PBX service provider) are disclosed. In some implementations, a set of fraud evaluation processes are performed, an overall fraud evaluation score is incremented as each of the set of fraud evaluation processes are performed and a step result is obtained. A user request (e.g., account activation) can be denied or accepted based on the overall fraud evaluation score. In some implementations, the set of fraud evaluation processes can include one or more of: an internal fraud evaluation process, a process for checking multiple trial accounts associated with a common account parameter, a process for geolocation verification of multiple account parameters, a process for device type verification for a contact phone number, a process for credit card verification, and a process for placing a contact number verification call.

18 Claims, 7 Drawing Sheets

(51) Int. Cl.
*G06Q 20/32* (2012.01)
*G06Q 20/40* (2012.01)
*G06Q 50/26* (2012.01)
*H04M 15/00* (2006.01)

(52) U.S. Cl.
CPC ............ *G06Q 50/265* (2013.01); *H04M 15/00* (2013.01); *H04M 15/47* (2013.01); *H04M 15/58* (2013.01); *H04M 2215/0148* (2013.01); *H04M 2215/0188* (2013.01)

(56) References Cited

U.S. PATENT DOCUMENTS

| | | |
|---|---|---|
| 7,788,151 B2 | 8/2010 | Pizzi et al. |
| 8,095,132 B2 | 1/2012 | Cheng et al. |
| 8,588,744 B2 * | 11/2013 | Vendrow et al. ............. 455/411 |
| 2004/0111305 A1 | 6/2004 | Gavan et al. |
| 2008/0040802 A1 | 2/2008 | Pierson et al. |
| 2009/0079538 A1 * | 3/2009 | Fein et al. .................... 340/5.82 |
| 2009/0222369 A1 | 9/2009 | Zoldi et al. |

OTHER PUBLICATIONS

Authorized Officer Nora Linder, International Preliminary Report on Patentability for PCT Application No. PCT/US2009/065976, dated Jun. 9, 2011, 6 pages.

* cited by examiner

FRAUD PREVENTION TECHNIQUES

CROSS-REFERENCE TO RELATED APPLICATIONS

This application is a continuation of U.S. application Ser. No. 12/626,066 titled "FRAUD PREVENTION TECHNIQUES," filed Nov. 25, 2009 (now U.S. Pat. No. 8,588,744), which claims the benefit of priority to U.S. Provisional Application No. 61/118,409 titled "FRAUD PREVENTION TECHNIQUES," filed on Nov. 26, 2008. The disclosures of the prior applications are considered part of and are incorporated herein by reference in the disclosure of this application.

TECHNICAL FIELD

This subject matter relates to fraud prevention for online services.

BACKGROUND

A private branch exchange (PBX) is a telephone network that serves a business or an office. A virtual PBX (vPBX) allows a business or office to be served by a PBX system hosted on remote servers. The service can be provided through a combined voice network (e.g., telephone network) and data network (e.g., Internet). Subscribers of virtual PBX services create and maintain subscriber accounts with the virtual PBX service provider over the Internet. Each service account can be charged as services are provided by the virtual PBX service provider and used by the account subscriber. Online credit card transactions and other online payment services can be utilized by account subscribers to pay for the services.

Different types of fraud attacks can occur with respect to online payment and account usage, causing financial and reputation damage to the service provider and the defrauded subscribers. For example, a fraudster may sign up for a PBX service account using a stolen credit card; the fraudster may not be genuinely interested in obtaining or paying for the PBX services, but only intends to take advantage of the service provider's credit card verification process for free. In another scenario, a fraudster may use a fake identity to open an account, use the services, but refuse to pay for the services. In yet another scenario, a fraudster may use an unauthorized credit card to open an account and use the service without the credit card owner's authorization, and the credit owner subsequently can dispute the charges for the services to obtain a charge-back. In yet another scenario, a fraudster may be a potential customer who opens multiple trial accounts with free services, but refuse to upgrade to a paid service after the trial period has ended.

Fraud prevention measures, if implemented, should minimize the adverse impact and reduce any inconvenience on existing customers and operational costs for the service providers.

SUMMARY

System, apparatus, computer program products and methods for preventing fraud attacks (e.g., on a virtual PBX service provider) are disclosed. In some implementations, a set of fraud evaluation processes are performed, an overall fraud evaluation score is incremented as each of the set of fraud evaluation processes are performed and a step result is obtained. A user request (e.g., account activation) can be denied or accepted based on the overall fraud evaluation score. In some implementations, the set of fraud evaluation processes can include one or more of: an internal fraud evaluation process, a process for checking multiple trial accounts associated with a common account parameter, a process for geolocation verification of multiple account parameters, a process for device type verification for a contact phone number, a process for credit card verification, and a process for placing a contact number verification call.

In some implementations, a method can include receiving a service request from a mobile device associated with a service account; validating the service request using one or more fraud evaluation processes; obtaining a fraud evaluation result for each fraud evaluation process; identifying a score based on the fraud evaluation result; and evaluating the service request based on the score.

In some implementations, a device can include a service manager configured to communicate with a mobile device associated with a service account, the service manager including a fraud prevention manager to: receive a service request from a service account associated with the mobile device; validate the service request using one or more fraud evaluation processes; obtain a fraud evaluation result for each fraud evaluation process; identify a score based on the fraud evaluation result; and evaluate the service request based on the score.

In some implementations, a system can include a mobile device configured to submit one or more service requests for enabling one or more telecommunications services on the mobile device; a database to store configuration data associated with the mobile device; and a control manager to communicate with the mobile device, the control manager including a service manager to: receive the one or more service requests; identify one or more fraudulent evaluation processes; validate the one or more service requests using the one or more identified fraudulent evaluation processes; and enable the one or more telecommunications services on the mobile device upon validation.

The one or more fraud evaluation processes can identify suspicious behaviors or characteristics that signal a fraud attack, and/or to limit the financial exposure of the service provider caused by user actions. The processes and parameters that can be used are not limited to those disclosed herein. The details of one or more implementations of the fraud prevention techniques are set forth in the accompanying drawings and the description below. Other features, objects, and advantages of the techniques will be apparent from the description and drawings, and from the claims.

DESCRIPTION OF DRAWINGS

Like reference symbols in the various drawings indicate like elements.

DETAILED DESCRIPTION

System Overview

Figure 1:
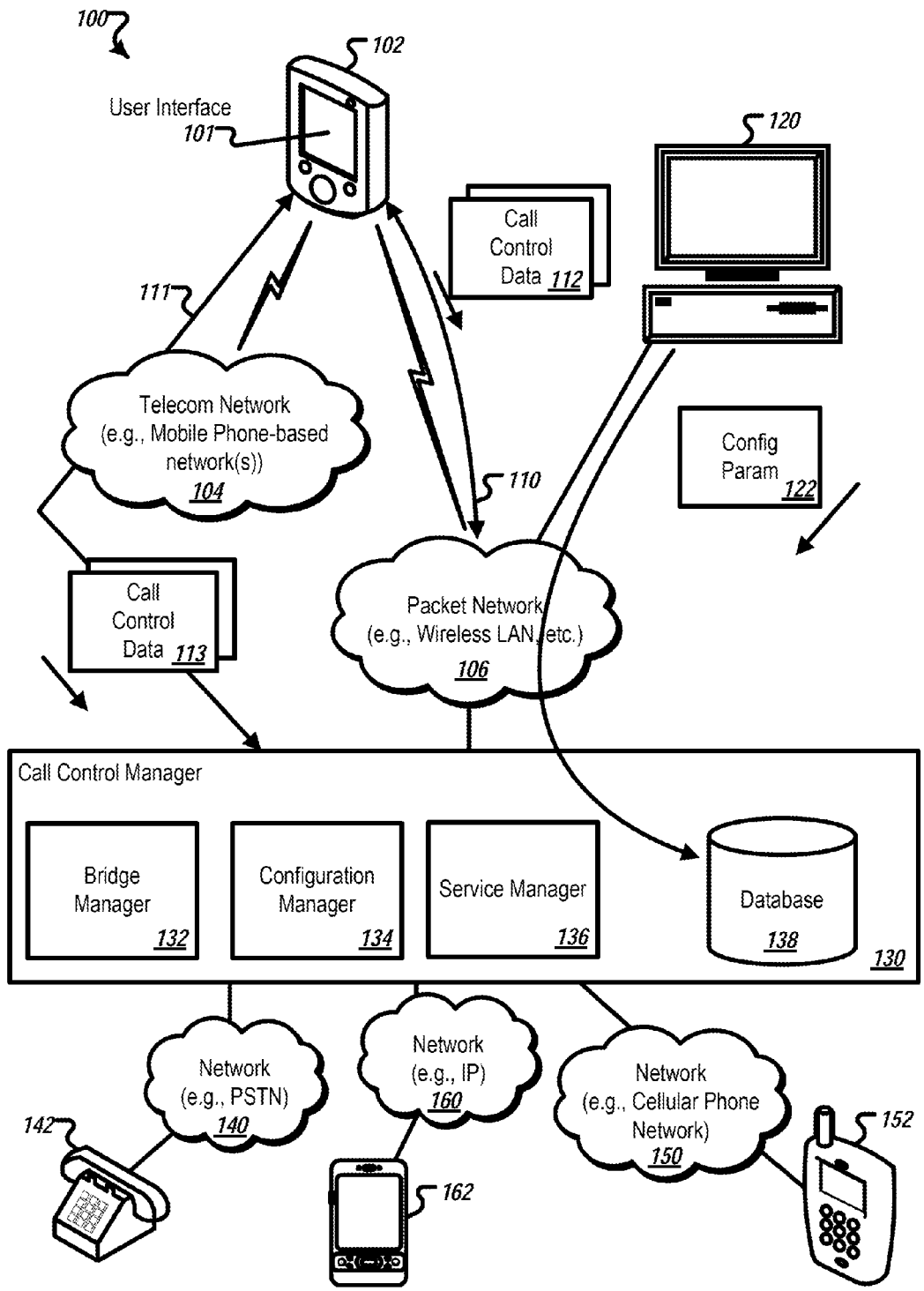
FIG. 1 shows an example of a call management system.

FIG. 1 shows an example of a call management system 100. As shown in FIG. 1, a mobile device 102 can be connected to a telecommunications ("telcom") network 104 and a packet network 106. The mobile device 102 can be configured to communicate with devices connected to the telecom network 104 and the packet network 106 using multiple modes of communication (i.e., "multi-modal channels of communication").

In some implementations, the telecom network 104 and the packet network 106 can each operate in a same or different mode of communication. For example, the telecom network 104 can operate in accordance with a first mode of communication. Examples of the first mode of communication can include Public Switched Telephone Network ("PSTN") phone modes, cellular/wireless telephone technology modes, such as Global System for Mobile communications ("GSM"), Frequency Division Multiple Access ("FDMA"), Time Division Multiple Access ("TDMA"), Code Division Multiple Access ("CDMA"), and other modes.

The packet network 106 can operate in accordance with a second mode of communication. The second mode of communication can be the same or different from the first mode of communication. Examples of the second mode of communication include Voice over Internet Protocol (VOIP) modes, wireless LAN modes (e.g., telephone technologies/standards, such as WiMAX and any other IEEE 802.xx-based modes), and other modes. Any number of modes is possible.

A call manager 130 can be coupled to the mobile device 102 through the telecom network 104 or the packet network 106. For example, the mobile device 102 can be configured to interact with the call control manager 130 over a call control communications channel. In some implementations, the call communications channel can include a broadband call control channel 110, and the broadband call control channel 110 can be established with the packet network 106 (e.g., in the same or separate channel used to convey voice/video data, such as in a Session Initiation Protocol ("SIP") message).

In some implementations, the call communications channel also can include a narrowband call control channel 111, and the narrowband call control channel 111 can be established with the telecom network 104 (e.g., a mobile operator can be provided in the same or separate channel used to convey voice/video data, such as in an Short Message Service ("SMS") message). The mobile device 102 and/or the call control manager 130 can be configured to transmit and/or receive call control data 113 and call control data 112 over the narrowband call control channel 111 and over the broadband call control channel 110, respectively. The call control manager 130 can be configured to effect a number of call controlling functions that can be performed remotely from the mobile device 102. For example, the call control manager 130 can execute call control operations in association with a first call from a communications device 142 via a PSTN network 140, a second call from a communications device 152 via an internet protocol (IP) network 150, and/or a third call from a communications device 162 via a cellular phone network 160.

In some implementations, the call control manager 130 can be disposed in a central office ("CO"). In some implementations, the mobile device 102 can include an interface 101 (e.g., a user interface) for facilitating the generation, receipt, processing, and management of the call control data 112 and 113 for delivery over the narrowband call control channel 111 and/or the broadband call control channel 110. The interface 101 can be configured to implement the various functionalities, including receiving inbound calls, dialing outbound calls, click to call generating a combined inbound and outbound call, and other functionalities.

In some implementations, the call control manager 130 can include a bridge manager 204, a configuration manager 134, and a repository database 136. Bridge manager 204 can be configured to perform, without limitation, inbound call delivery, call routing, call transfer functions, and conference call functions for the mobile device 102. For example, an inbound missed call can be recorded (e.g., voice mail) on the mobile device 102 and/or on the call control manager 130 and simultaneously reviewed on the mobile device 102 using the interface 101. During call recording, the call manager 130 can allow the inbound call to be answered dynamically at the mobile device 102 and/or transferred to one of the communications devices 142, 152, and 162. Completed recordings (e.g., announcements, voice mail, etc.) can be reviewed at the mobile device 102 using the interface 101.

The configuration manager 134 can be configured to interact with a remote computing device 120 or with the mobile device 102 to receive configuration parameter data ("conf param") 122. The configuration manager 134 can store the configuration parameter data 122, and responsive to such data, the call control manager 130 can control inbound calls before, during, or after reaching the mobile device 102. The configuration manager 134 also can be configured to store (e.g., in the database 136) audio files recorded through the interface 101 on the mobile device 102, and transmit the stored files to the mobile device 102 using the narrowband call control channel 111 and/or the broadband call control channel 110.

In some implementations, the call control manager 130 also can include a service manager 136 configured to interact with a remote computing device 120 or with the mobile device 102 to receive account activation requests, account management requests, payment requests, and other subscriber account service requests. The service manager 136 can also be configured to perform account activation, account provisioning, account status/usage recordkeeping, and one or more fraud prevention procedures described in this specification. The service manager 136 can operate to communicate with one or more external service providers to send and obtain parameters and data necessary to carry out the fraud prevention procedures. The service manager 136 can also be configured to save data to and obtain data from the repository database 138.

Example Device Implementation

Figure 2:
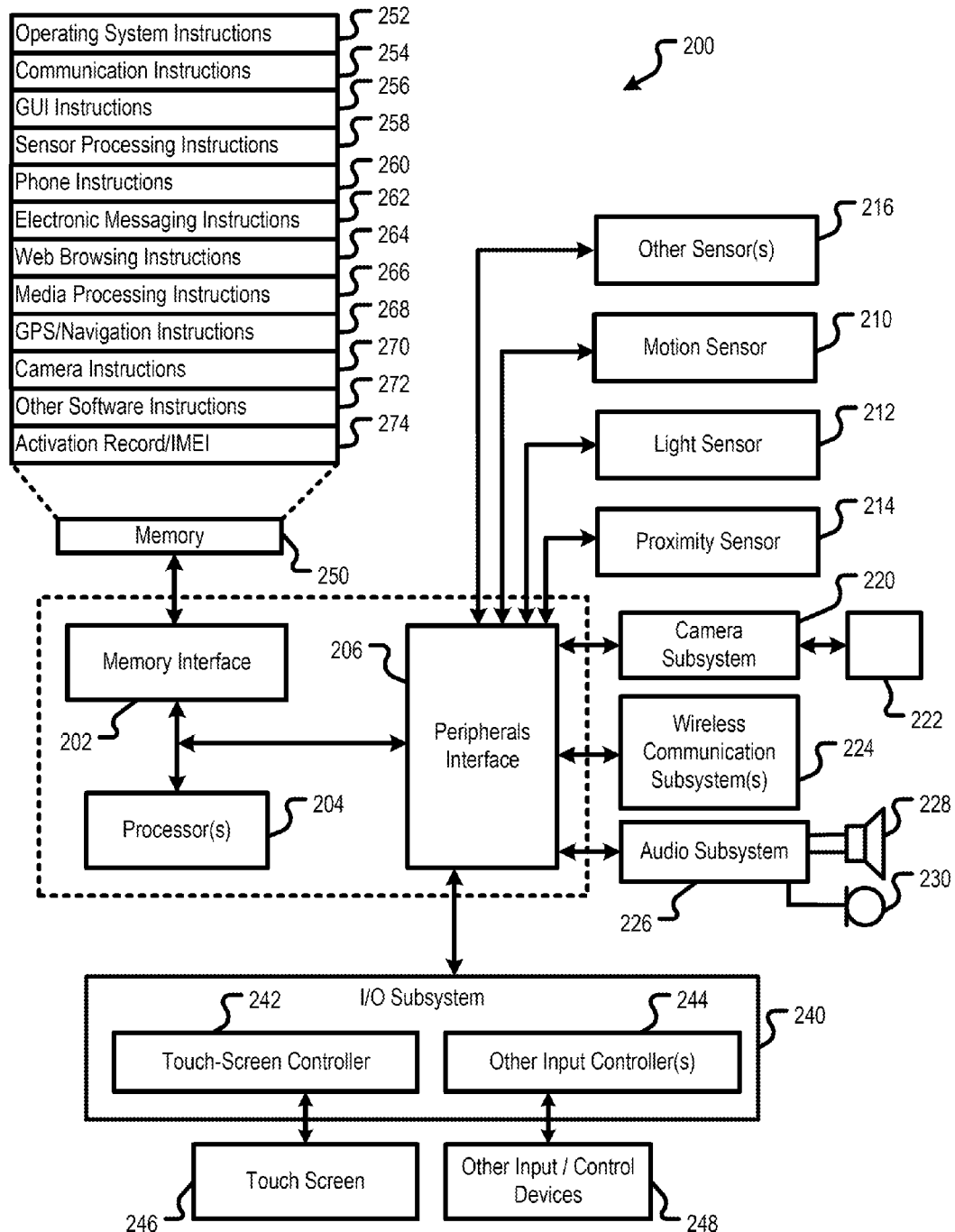
FIG. 2 shows an example of a mobile device.

FIG. 2 shows an example of a mobile device 200. The mobile device 200 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities.

A camera subsystem 220 and an optical sensor 222 (e.g., a charged coupled device ("CCD") or a complementary metaloxide semiconductor ("CMOS") optical sensor) can be utilized to facilitate camera functions, such as recording photographs and video clips.

Communication functions of the mobile device 200 can be facilitated through one or more wireless communication subsystems 224, which can include radio frequency receivers and transmitters and/or optical (e.g., infrared) receivers and transmitters. The specific design and implementation of the wireless communication subsystem 224 can depend on the communication network(s) over which the mobile device is intended to operate. For example, a mobile device can include communication subsystems 224 designed to operate over a GSM network, a GPRS network, an EDGE network, a Wi-Fi or WiMax network, and a Bluetooth™ network. The wireless communication subsystems 224 can include hosting protocols such that the mobile device can be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as, without limitation, one or more buttons, rocker switches, thumb-wheel, infrared port, USB port, and/or a pointer device such as a stylus. The one or more buttons (not shown) can include an up/down button for volume control of the speaker 228 and/or the microphone 230. The touch screen 246 also can be used to implement virtual or soft buttons and/or a keyboard.

In some implementations, a pressing of the button for a first duration can disengage a lock of the touch screen 246; and a pressing of the button for a second duration that is longer than the first duration can turn power to the mobile device on or off. The user can be able to customize a functionality of one or more of the buttons. The touch screen 246 can, for example, also be used to implement virtual or soft buttons and/or a keyboard.

In some implementations, the mobile device 200 can present recorded audio and/or video files, such as MP3, AAC, and MPEG files. In some implementations, the mobile device 200 can include the functionality of an MP3 player.

The memory interface 202 can be coupled to the memory 250. The memory 250 can include high-speed random access memory and/or non-volatile memory, such as one or more magnetic disk storage devices, one or more optical storage devices, and/or flash memory (e.g., NAND, NOR). The memory 250 can store an operating system 252, such as, without limitation, Darwin, RTXC, LINUX, UNIX, OS X, WINDOWS, or an embedded operating system such as VxWorks. The operating system 252 can include instructions for handling basic system services and for performing hardware dependent tasks. In some implementations, the operating system 252 can be a kernel (e.g., UNIX kernel). If the service provider permits porting out line numbers, the service provider can require an authorization form.

The memory 250 can also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions.

The memory 250 can also store other software instructions such as web video instructions to facilitate web video-related processes and functions; and/or web shopping instructions to facilitate web shopping-related processes and functions. In some implementations, the media processing instructions 266 can be divided into audio processing instructions and video processing instructions to facilitate audio processing-related processes and functions and video processing-related processes and functions, respectively. An activation record and International Mobile Equipment Identity ("IMEI") 274 or similar hardware identifier can also be stored in the memory 250.

Each of the above identified instructions can include portions or be related to one or more applications that correspond to functions described herein. These instructions need not be implemented as separate software programs, procedures, or modules. The memory 250 also can include additional instructions or fewer instructions. Furthermore, various functions of the mobile device 200 can be implemented in hardware and/or in software, including in one or more signal processing and/or application specific integrated circuits.

Call Control Manager

Figure 3:
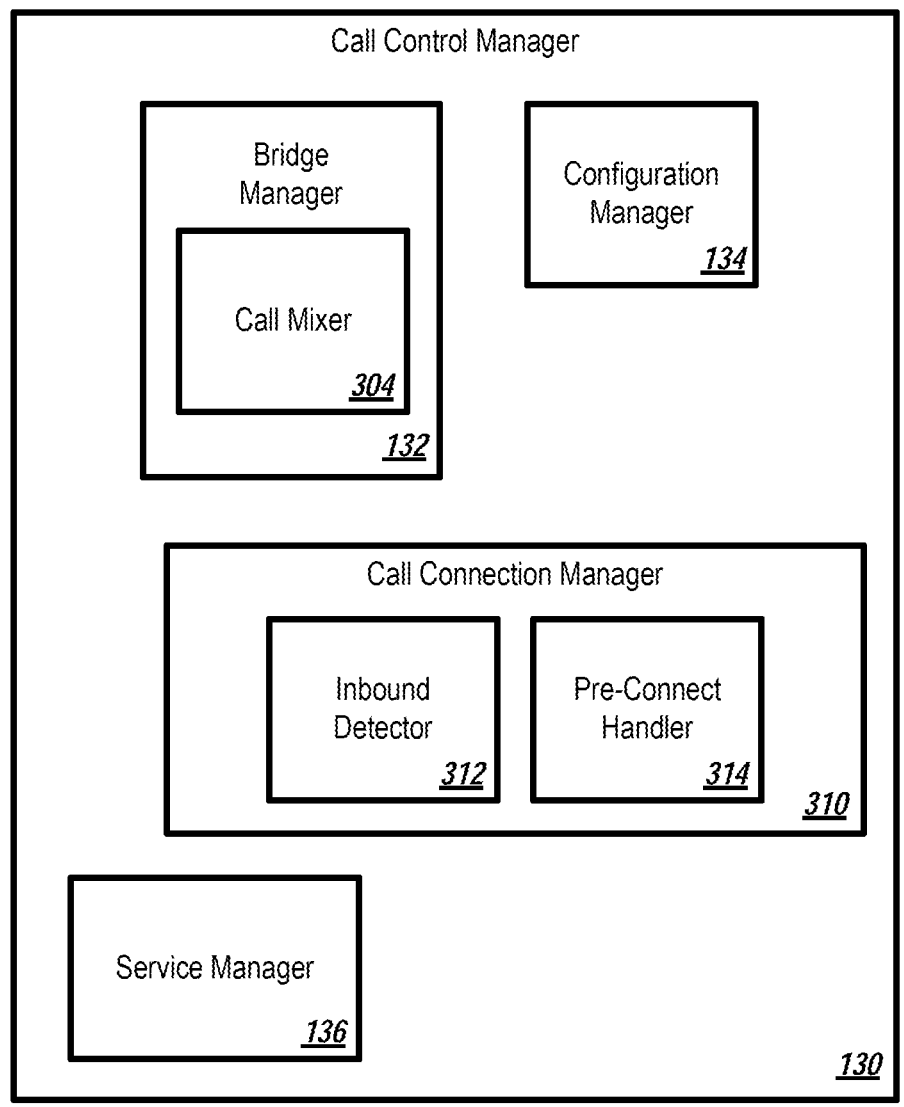
FIG. 3 shows an example of a call control manager.

FIG. 3 shows an example of a call control manager 130. The call control manager 130 can include a bridge manager 132, a configuration manager 134 configured to receive configuration parameters and execute call functions in accordance with the configuration parameters, a call connection manager 310, and a service manager 136 configured to implement the fraud prevention techniques described herein as well as to provide other account management services.

The bridge manager 132 can include a call mixer 304. In some implementations, the call mixer 304 can be configured to combine calls using various telecommunication technologies and protocols. The call mixer 304 can use different CODECs to implement the various telecommunication technologies and protocols. In some implementations, the call mixer 304 can reside in the mobile device 102. In some implementations, the call mixer 304 can be external to the mobile device 102.

The call connection manager 310 can include an inbound detector 312 and a pre-connection handler 314. The inbound detector 312 can detect a call (or a request for callback) from any communications device (e.g., communications devices 142/152/162 shown in FIG. 1) and can determine whether a communication link to the mobile device 102 (e.g., using the packet network 106 of FIG. 1) can be established. For example, the inbound detector 312 can communicate with the mobile device 102 to determine whether a data rate of more than, for example, 8 kb/sec is obtainable. If the specified data rate is not practicable, the inbound detector 312 can determine an appropriate course of action (e.g., directing the call to the user's voicemail) until the specified data rate is above an acceptable threshold.

The pre-connect handler 314 can interact with the mobile device 102 to receive an instruction in the call control data 112 to handle a call from either the communications device 142 or 152, or a click-to-call request from the communication device 162 of FIG. 1 before a connection is made. The pre-connect handler 314 can also interact with the mobile device 102 to receive an instruction from the call control data 113 to handle a call (or a request for callback) from the communications devices 142/152/162.

In some implementations, the call control data 113 can be incorporated into an SMS message (or any other type of messaging protocol) that can be sent to the control manager 130 using the telecom network 104. For example, the mobile device 102 can generate the call control data 113, and the call control data 113 can include an instruction that instructs the call control manager 130 to transmit a message to the communications devices 142/152/162. An example of such a message can include, for example, "I am out of wireless LAN range. I will call you later when I can make a VOIP call." Components of the call control manager 130 can be implemented in hardware or software, or a combination thereof. Any of the functions of call control manager 130 can be available to any communications devices 142, 152, and 162 as to the mobile device 102 of FIG. 1.

The configuration manager 134 can be configured to store and update configuration parameter data for various call control functions in databases associated with the call control manager. The configuration manager 134 can communicate with the bridge manager 132 and the connections manager 310 to carry out various call functions. In some implementations, configuration data can include, for example, extension setup, standard greetings, voice mail settings, forwarding rules, and on the like.

The service manager 136 can be configured to interact with a remote communications device to receive and process account activation requests, account management requests, payment requests, and other subscriber account service requests. The service manager 136 can also perform one or more fraud evaluation processes when processing one or more of the above mentioned requests, as will be discussed in greater detail below.

Service Manager

Figure 4:
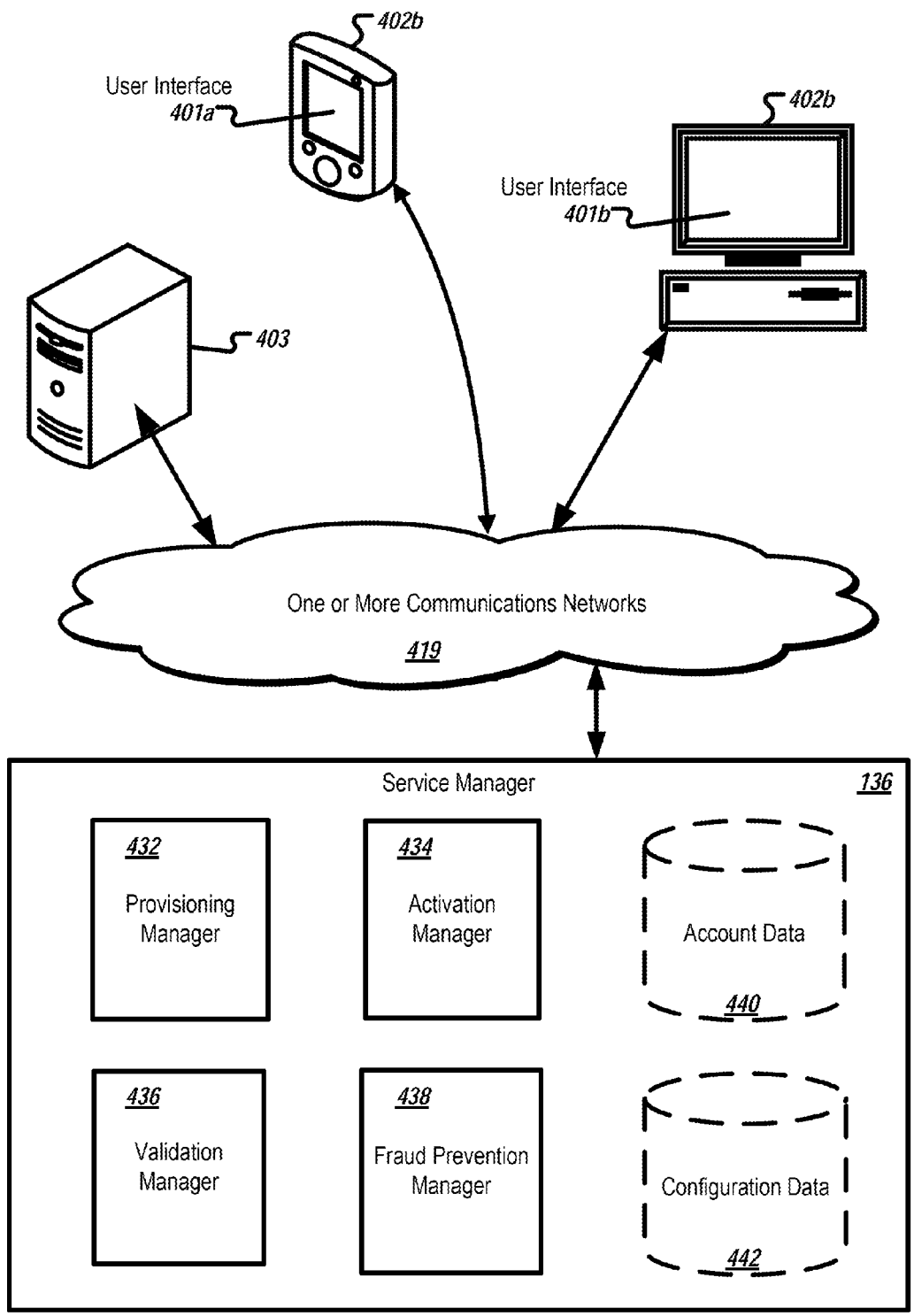
FIG. 4 shows an example of a service manager associated with the call control manager shown in FIG. 3.

FIG. 4 shows an example of the service manager 136. As shown in FIG. 4, the service manager 136 can include a provisioning manager 432, an activation manager 434, a validation manager 436, and a fraud prevention manager 438. The service manager 136 can also include one or more repositories (e.g., an account data repository 440 for storing account data, and a configuration data repository 442 for storing configuration data). In some implementations, both repositories 440 and 442 can be external to the service manager 136. In some implementations, the repository 442 can be the same repository as the database 138 shown in FIG. 1.

The service manager 136 can be configured to communicate with a remote communications device 402a or 402b (e.g., a phone, a mobile device, or a computing device) to receive account activation requests, account management requests, payment requests, and other subscriber account service requests. The communication can be accomplished over one or more communication networks. In some implementations, the service manager 136 can generate an interface 401a or 401b (e.g., a web interface, or a graphical user interface in a communication software application) to accept account signup requests. Data received from the interface 401a or 401b can include user identification information (e.g., name, ID number, contact information, address information, source IP address, etc.), payment data (e.g., credit card information, billing address information), account type (e.g., trial account, or paid account), and service level (e.g., different service packages), and other data. The service manager 136 can be configured to store account signup request data in the account data repository 440. In some implementations, account data modification requests (e.g., change in address, name, contact information, credit card information, account type, service level, etc.) and other account services requests (e.g., payment, dispute of charges) can be processed, and related data can be stored in the account data repository 440.

The activation manager 434 can perform account activation upon user request, and provisioning manager 432 can perform account provisioning for the account to be activated. The configuration data repository 442 can be configured to store configuration data for configuring the telecommunications services subscribed in each account. In some implementations, the provisioning can be completed before an account activation request is received and a set of preconfigured telecommunications services can be instantly activated once the activation manager processes and approves an account activation request. For example, a trial account with a limited set of free services can be instantly activated by the activation manager 434 using a limited set of account activation request data (e.g., where only an email address is required). In some implementations, the set of telecommunications services can include, without limitation, call forwarding, call routing, facsimile, email, text messaging, voice messaging (i.e., voice mail), extensions, PBX services, and other services.

Provisioning and activation can also be performed after a complete set of account activation request data has been received and processed. Before the account provision and activation, the fraud prevention manager 438 can first determine whether the account activation request is likely to be fraudulent. If the request is determined to be legitimate, the provisioning and activation are permitted; and if the request is determined to be suspicious or fraudulent, the request is denied or subject to further review.

In some implementations, once an account has been activated, the validation manager 436 can optionally be used to validate successful provisioning and activation of the subset of telecommunications services. For example, to validate an account, the validation manager 436 can be configured to make a call to the telephone number associated with the account. As another example, the validation manager 436 can be used to send an email massage to an email address associated with the account.

The fraud prevention manager 438 can be configured to perform tasks such as, without limitation, account status/usage recordkeeping and one or more fraud prevention procedures. In some implementations, the fraud prevention procedures can include, without limitation, a multi-step fraud evaluation process. The fraud prevention manager 438 can communicate with one or more external service providers 403 to send and obtain parameters and data necessary to carry out the fraud evaluation processes. A fraud evaluation score can be obtained during and at the completion of the fraud evaluation process and used to determine whether a particular user request is likely associated with fraud and should be denied. In some implementations, the parameters and data in the user request and results obtained from the fraud evaluation processes can be stored in the account data repository 440 for further review and analysis.

In some implementations, the external service providers 403 can be used for geolocation determination of source IP addresses (e.g., IP addresses from which the account activation requests originated), credit card verification, address verification, telephone number verification, and other support functions. In some implementations, internal databases (e.g., database 138) can store lists (e.g., blacklists or white lists for source IP addresses, credit cards, names, addresses, email addresses, and contact phone numbers) associated with known fraudulent or approved accounts. Parameters in each account activation request can be compared against the stored lists during the fraud evaluation process. In some implementations, the account activation request data, as well as the results obtained from external service providers 403 for the request can be stored in the account data repository 440. In some implementations, the fraud prevention manager 438 also can retrieve account-related data (such as account status, billing history, account usage history, etc.) from the account data repository 440 for use in the fraud prevention procedures.

In some implementations, the fraud prevention manager 438 carries out the fraud evaluation process before an account activation or account modification request is carried out. If the fraud prevention manager 438 determines that a particular request is likely to be fraudulent, the request can be denied or otherwise processed (e.g., flagged, stored, or held for further approval). In some implementations, the account-related data, such as, without limitation, user ID, source IP address, address information, credit card information, contact information (email or telephone numbers), account usage patterns can be stored in the account data repository 440 on one or more blacklists.

In some implementations, an overall fraud evaluation score can be obtained for at least one fraud evaluation process. In some implementations, the overall fraud evaluation score can be computed based on the scores obtained in each individual fraud evaluation process. In some implementations, the overall fraud evaluation score can include the sum of the scores obtained in each individual fraud evaluation process. Other ways of combining and weighting scores is possible. In some implementations, different results in each process can lead to different scores in that process. In some implementations, a decision regarding whether to deny an account activation or modification request can be based on the overall fraud evaluation score or the total score of a subset of the fraud evaluation processes.

Fraud Evaluation Process

Figure 5:
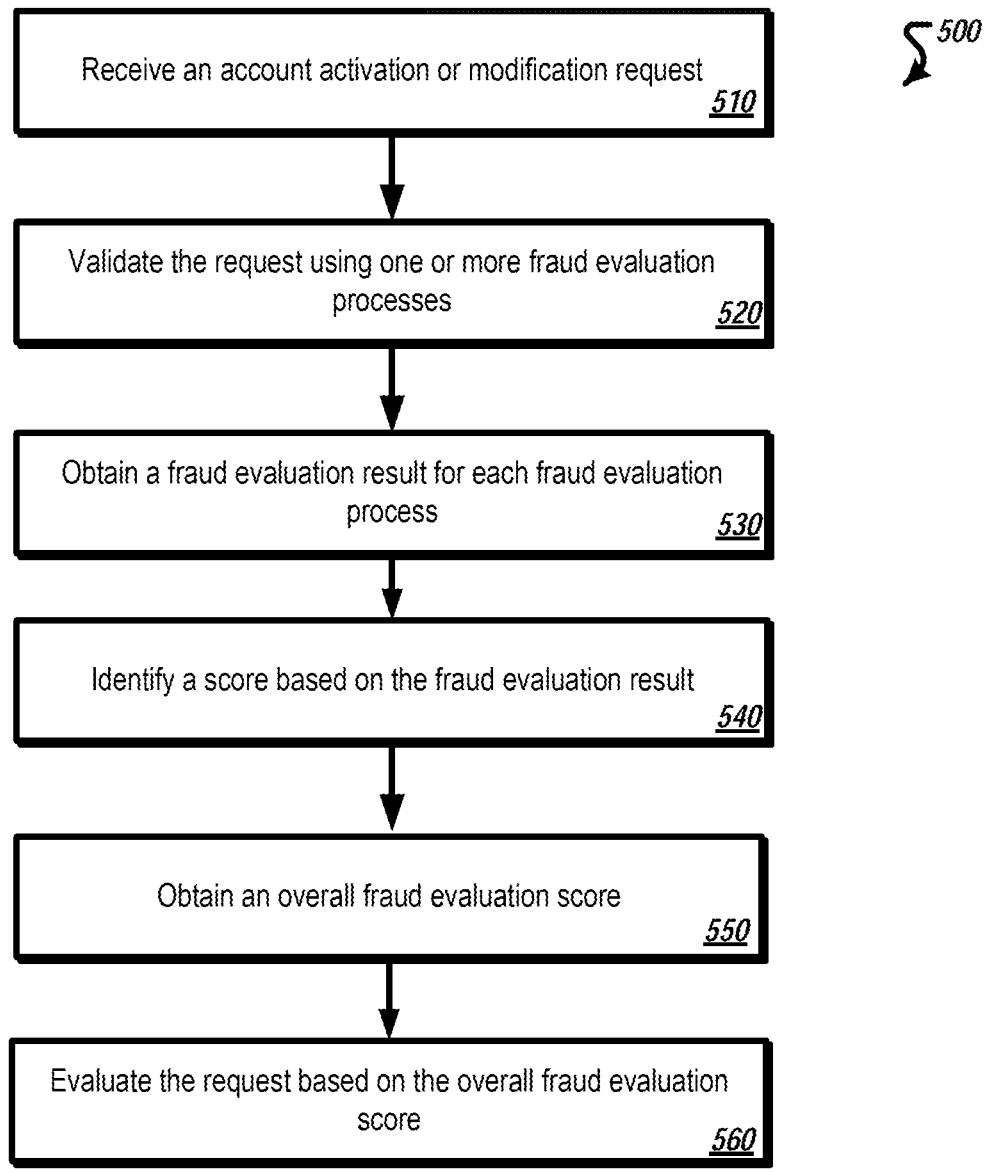
FIG. 5 shows an example of a fraud evaluation process.

FIG. 5 shows an example of a fraud evaluation process 500. An account activation or modification request can be received (510), and the request can be validated using one or more fraud evaluation processes (520). A fraud evaluation result (e.g., from an external or internal data source) for a parameter in the request can be obtained for each fraud evaluation process (530). A score can be identified for the fraud evaluation result (540). An overall fraud evaluation score can be obtained (550). In some implementations, the overall fraud evaluation score can be reiteratively incremented by the amount of the score for each process (e.g., upon completion of all the fraud evaluation processes). The account activation or modification request can then be evaluated based on the overall fraud evaluation score (560).

In some implementations, the fraud evaluation process 500 can be triggered by a request for account activation received by the service manager 136 in FIG. 1 from a communications device (e.g., a computing device or a mobile device) over one or more communications networks. In some implementations, the fraud evaluation process 500 can be triggered by a request for account modification, such as, without limitation, change of user name, contact information, credit card information, payment option, account type, or other modification. In some implementations, other events on the system can trigger the fraud evaluation process 500. In some implementations, the fraud evaluation process 500 can be applied to an account activation request or an existing account. One or more parameters can be received with the account activation or modification request, and additional parameters can be obtained from the database for the existing account.

In some implementations, obtaining a fraud evaluation result from an external or internal data source for a parameter (530) can further include sending the parameter to the external or internal data source as input, obtaining an output from the external or internal data source, and analyzing the output to obtain a fraud evaluation result. In some implementations, the external data source can be a data verification service provider (e.g., credit card verification, or telephone number verification services). In some implementations, the internal data source can include databases containing account information or internal blacklists. In some implementations, the fraud evaluation result can be a "pass," "fail," "suspicious" status flag.

In some implementations, identifying a score for the fraud evaluation result (540) can be executed using a lookup table of fraud evaluation results with corresponding scores. Each fraud evaluation result can be given a different score indicating the level of risk associated with a particular type of result. For example, if an address verification process returns a negative result, the negative result can be given a higher risk score than a partially verified result. In some implementations, if a process is not successfully passed (e.g., a contact phone number cannot be verified), the system can request the user to reenter the data (e.g., enter another contact phone number), and a score can be given for each data reentry in this process. In some implementations, the overall fraud evaluation score can include a sum of all step scores (e.g., each obtained from a different fraud evaluation process), and in some processes where multiple data entries are conducted, the step score for each data entry can be added to the overall fraud evaluation score.

In some implementations, the overall fraud evaluation score can be obtained when all fraud evaluation processes have been completed. In some implementations, an overall fraud evaluation score can be continuously updated as processes are completed. In some implementations, if the overall fraud evaluation score reaches a certain threshold value in a particular process (e.g., above which a status of "fail" can be assigned), no further processes need to be performed and the action request (e.g., activation or modification request) can, for example, be automatically denied. Alternatively, when the overall fraud evaluation score reaches a certain threshold value in a particular process, additional fraud evaluation procedures can be performed. In some implementations, a range of acceptable overall fraud evaluation scores can be specified, and requests or accounts with scores that fall outside the specified range can be labeled as "suspicious" or "fraudulent." In some implementations, account requests that receive a "suspicious" or "fraudulent" score can be denied, and accounts that are associated with "suspicious" or "fraudulent" parameters can be suspended or subject to additional manual review by an administrator or additional verification or fraud evaluation processes.

In some implementations, more than one fraud evaluation process can be performed. Where multiple fraud evaluation processes are executed, the fraud evaluation processes can be performed in a particular sequence. For example, the more costly (in terms of time, money, resources, etc.) processes (e.g., those that require more expensive verification services) can be performed later in the sequence such that these processes are only performed if the results of one or more previous procedures are not determinative. Alternatively, the more costly processes can be performed later in the sequence such that if an account has been determined to be fraudulent in the earlier less costly processes, the latter processes no longer need to be performed. In some implementations, certain processes are only performed if the result from a previous process meets (or does not meet) certain predetermined criteria (e.g., a verification call can be placed only when the contact phone number provided is not found in a database lookup).

In some implementations, the fraud evaluation processes can include an internal fraud evaluation process. Account parameters in an activation request or account modification request (e.g., source IP address, credit card information, address information, contact information, etc.) are matched against parameters stored in various internal lists, such as source IP blacklist, credit card blacklist, user ID/name blacklists, email address blacklist, and contact phone number blacklist, etc. Blacklisted parameters can be obtained over time from known fraudulent accounts. If one or more matches are found, a score can be determined accordingly. For example, each match can be given a score, and the overall fraud evaluation score can be incremented by all of the scores resulted from the list matches. In some implementations, if the overall fraud evaluation score is more than or equal to a fraud score threshold, the fraud evaluation can terminate and the action request can be denied and/or the account can be terminated. No further processes need to be executed and the data related to the request or the account can be recorded for further analysis.

In some implementations, the internal fraud evaluation can also include checking for multiple accounts associated with a common account parameter (e.g., email address, contact phone number, credit card, name, etc.) The rationale for this check is to limit the financial risk exposure of the service provider with respect to each individual user. For example, the service provider may want to eliminate the possibility that a user can open multiple free accounts and use the service for free without ever upgrading to a paid account. If multiple paid accounts are associated with the same user, it is likely that the user is not using the accounts for the services, but may simply be using the account activation process to verify different stolen credit cards.

Alternatively, unrelated users can be using the same stolen credit card information for their own accounts, but eventually the true owner can discover the use and demand a charge back. To limit the financial risk exposure, the total number of accounts (past or present) associated with a common account parameter (e.g., email address, contact phone number, credit card number, or online payment account) can be set to a small value, such that no user is in control of a large number of accounts. If multiple accounts are found to be associated with a common parameter (e.g., contact phone number, email address and the like), these multiple accounts can all be flagged as "suspicious" and subject to further review. In some implementations, slight variations of email addresses or account information can be detected. For example, a fraudster can generate a new email address by modifying an existing email address using a simple algorithm (such as by adding a single digit after the user name), and the slight variations can be detected using an algorithm that measures a distance between the email address text strings (e.g., a Levenshtein distance). In some implementations, a score can be given for each of the additional accounts found to be associated with a common parameter, and the overall fraud evaluation score can be incremented for each additional account associated with a common account parameter.

In some implementations, the internal fraud evaluation can also include checking for multiple failed account signups associated with a common account parameter (e.g., email address, contact phone number, credit card or name). The number of failed account signups can be detected based on the records in the internal database. In some implementations, if the number of failed attempts exceeds a certain threshold value, the account parameters (e.g., source IP address, name, address, contact information or credit card) associated with the failed attempts can be stored in one or more blacklists in the internal database. In some implementations, the number of failed attempts for data entry in each fraud evaluation process can also be recorded. For example, during a contact phone number verification process, if a user continuously enters invalid phone numbers, and the total number of invalid entries exceeds a predetermined threshold value, the account parameters associated with the action request can also be recorded in one or more blacklists in the internal database. In some implementations, a score can be given for each additional data entry attempt, and the overall fraud evaluation score can be incremented for each additional data entry attempt in each process.

In some implementations, the fraud evaluation processes can include a primary contact phone number verification process. When a fraudster signs up for an online services account, he/she may use a fake telephone number as contact number. Therefore, it can be useful to verify the contact telephone number a user provides to identify these fake telephone numbers. The contact phone number provided by a user can normally be verified in the NPA/NXX database (e.g., the Numbering Planning Area code/Central Office or Exchange code database). In some implementations, if the contact phone number is a U.S. phone number, but is not found in the NPA/NXX database, then the account associated with the phone number can be flagged as "suspicious." In some implementations, a verification call can be placed to determine if the number given is a valid number. In some implementations, a score can be given for the unverified contact phone number that is added to the overall fraud evaluation score. In some implementations, the user can be prompted to enter a new number and go through the primary contact phone verification process again before continuing with the account activation process. In some implementations, the unverified contact phone number can be entered into a blacklist. In some implementations, international number, toll-free numbers, 900 numbers, and numbers provided by the virtual PBX service provider itself can also be flagged as "suspicious" or "unacceptable."

In some implementations, the fraud evaluation processes can include a credit card verification process. In some implementations, an external service provider can provide Address Verification Service (AVS) for a credit card. The external service provider can check the billing address of the credit card provided by the user with the address on file at the credit card issuer. AVS verifies the numeric portions of a cardholder's billing address. For example, if the billing address is 101

Main Street, Highland, Calif. 92346, AVS will check 101 and 92346. The AVS also can check additional digits such as an apartment number. Other information that can be verified can include, without limitation, credit card number, cardholder name and expiration date. The result for the verification can be partial verification, complete verification, or undetermined (e.g., if the card issuer does not offer such information). Different scores can be given for each of the verification result. In some implementations, within partial verification results, different scores can be given for each type of partial verification. For example, an unverified zip code can receive a higher fraud score than an unverified street number. The AVS credit card verification process can help filter out fraudsters who have possessions of stolen credit cards, but do not have the complete credit card account information. In some implementations, the credit card verification process can also check the Card Verification Value2 (CVV2). CVV2 is the number printed typically on the back of a credit card. Verification for CVV2 can help filter out fraudsters using stolen credit card information without possession of the physical card. In some implementations, the results for CVV2 (e.g., complete match, partial match, or CVV2 not supported by card issuer) all receive different fraud scores and cause different increment for the overall fraud evaluation score.

In some implementations, the fraud evaluation processes can include a process to verify the device type associated with a contact phone number provided by the user. In some implementations, an external service provider can provide information regarding the device type associated with the contact phone number. For example, an outside telephone verification service provider (e.g., TeleSign, located in Beverly Hills, Calif.) can determine whether a phone number is associated with a fixed line, a mobile line, a pre-paid mobile line, toll-free, non-fixed VOIP line, a pager, a payphone, a restricted line, a personal line, a voicemail box, an invalid number, or other device. In some implementations, the device type verification request can be sent by the fraud prevention manager 438 of FIG. 4 to the external service provider 403. Alternatively, the device type verification request can be sent from the user device directly to the external service provider using, for example, a SOAP API, and only the result of the device type verification is sent back to the fraud prevention manager 438.

In some implementations, only fixed lines, mobile lines, and personal lines are acceptable results and receive low risk scores; all other results can lead to various high risk scores. If a device type is not one of the acceptable device types, the fraud prevention manager 438 can prompt the user to enter a new, acceptable contact phone number before proceeding to the next process. In some implementations, a flag of "suspicious," or "rejected" can be attached to the phone numbers associated with unacceptable device types, and the account data is stored in the database for future review and analysis. In some implementations, where the user has entered a "rejected" or "suspicious" phone number, and even if an acceptable number is subsequently entered, the user account can be flagged as "suspicious," and the overall fraud evaluation score can be incremented according to the number of failed phone number entries. In some implementations, if the number of failed phone number entries exceeds a threshold value, then the user is considered to have failed this verification process, and the process can be terminated and the account activation or modification request can be denied.

In some implementations, the fraud evaluation processes can include a process to verify consistency between various addresses in the user account or the activation request. Geolocation information of the user can be obtained from various third-party service providers based on source IP addresses, contact telephone numbers, credit card or online payment accounts, and user-entered addresses associated with an account activation or modification request. Consistency of the geolocation information for these account parameters can be an indicator of whether the account is fraudulent. For example, if the billing address of a credit card is in one state, the contact phone number is in another state, and the source IP is in another country, it is highly likely that the account is tied to a fraudulent use. In some implementations, if any of the above addresses are not consistent with one another, the inconsistency is recorded, and a flag can be raised. In some implementations, different score increments can be assigned for non-matching countries, states, cities, zip codes, and time zones, etc. Other considerations that also influence the score increments can include, for example, the distance between the non-matching addresses.

In some implementations, the fraud evaluation processes can further include a process to place a contact phone verification call to the user's contact phone number. In some implementations, the verification call process can be triggered when a result from one or more other fraud evaluation processes have been unfavorable as will be discussed in greater detail below with respect to FIG. 6.

Phone Verification Process

Figure 6:
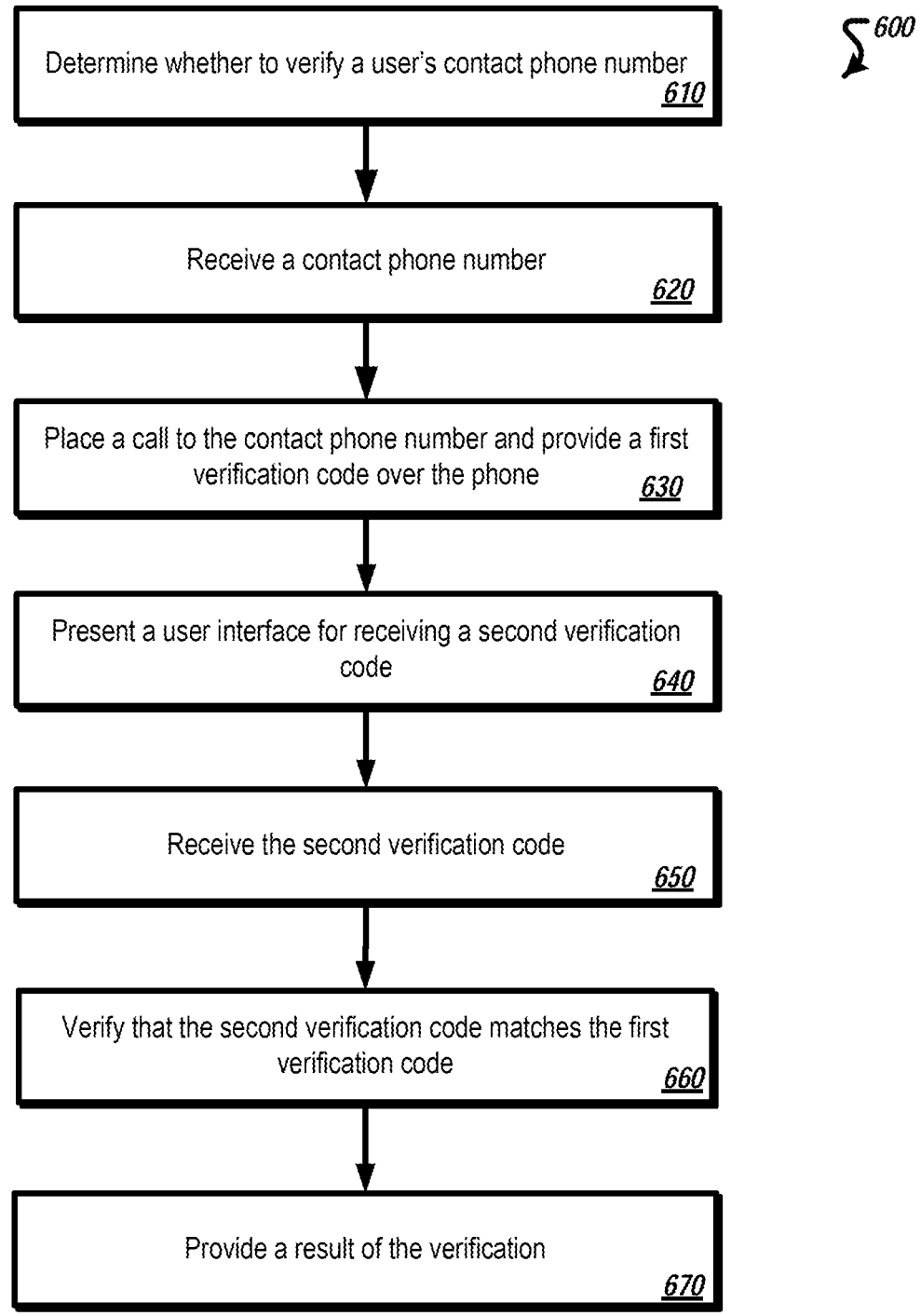
FIG. 6 shows an example of a fraud evaluation process associated with placing a contact phone verification call.

FIG. 6 shows an example fraud evaluation process 600 for placing a contact phone verification call. As shown in FIG. 6, the process 600 can include determining whether to verify a user's contact phone number (610). A contact phone number from a user can be received (620), and a call can be placed to the phone number and a first verification code can be provided over the phone (630). A user interface for receiving a second verification code from the user can be presented (640). The second verification code can be received from the user (650). The second verification code can be verified to match the first verification code (660), and a result of the verification can be provided (670).

In some implementations, the contact phone verification call process can be triggered when an account activation request is received by the service manager 136. In some implementations, the contact phone verification call process can be triggered when the user changes the contact phone number in an existing account. In some implementations, the process can be triggered when the user converts a free account to a paid account, but the contact number in the free account has not yet been verified. In some implementations, other verification processes can be performed before the contact phone verification call is placed. For example, the number can first be verified against a contact phone blacklist, an external telephone number database, or an internal database to determine if the number is a virtual PBX number already assigned to an account with the service provider 136. In some implementations, the verification call is only placed if the user has failed one or more other fraud evaluation processes.

In some implementations, the first verification code can be recorded in a sound file and played over the phone. In some implementations, the verification code can include a series of digits or letters. In some implementations, one or both of the first verification code and the second verification code can be transmitted using messages (e.g., using short messaging service (SMS) or multimedia messaging service (MMS)).

In some implementations, a special user interface can be displayed explaining the contact phone verification call procedure to the user. The fraud prevention manager 438 can place the call to the user's contact phone number. Then, the service manager 136 or fraud prevention manager 438 can cause a user interface to be displayed on the client device (e.g., a computer device, or a mobile device) requiring the verification code. If the code is correctly entered by the user, then this process concludes successfully. If no correct code is entered, then the contact phone number can be flagged as suspicious or rejected. In some implementations, if the phone number is flagged as rejected or suspicious, the user has an opportunity to enter a new number and go through the process again. In some implementations, the system only allows a limited number of attempts. The number and results of the verification calls can be recorded for future review and analysis. In some implementations, a score increment can be given based on the results and the number of attempts.

Fraud Evaluation Administrative Interface

In some implementations, the account signup data and related fraud evaluation results can be recorded in databases for future analysis and review in an administrative interface. In some implementations, the administrative interface can allow searches for the account signup data and fraud evaluation results according to one or more characteristics parameters. For example, the interface can allow searches according to dates, the different types of flags (pass, fail, suspicious, etc.) that are attached to the account in each of the one or more fraud evaluation processes, the current account status, current account service level, and so on. In some implementations, account data and fraud evaluation results can be displayed for each account in the administrative interface for individualized evaluation.

In some implementations, an overview interface can be implemented to show one or more of the following: total number of signups during a specified time period, for a specified service level, or a specified account status. In some implementations, the overview interface can also show the number of signups for which contact phone verification call was required, passed, or failed.

In some implementations, the results of the fraud evaluation processes can be shown in a nested table in the fraud evaluation administrative interface. Each row of the table can represent a fraud evaluation process. The columns of the table can include the type of fraud evaluation procedure, whether a particular procedure has been executed, the score for the particular procedure, details regarding the results, input data for this procedure, and output for the procedure, etc.

Generic Computer System

Figure 7:
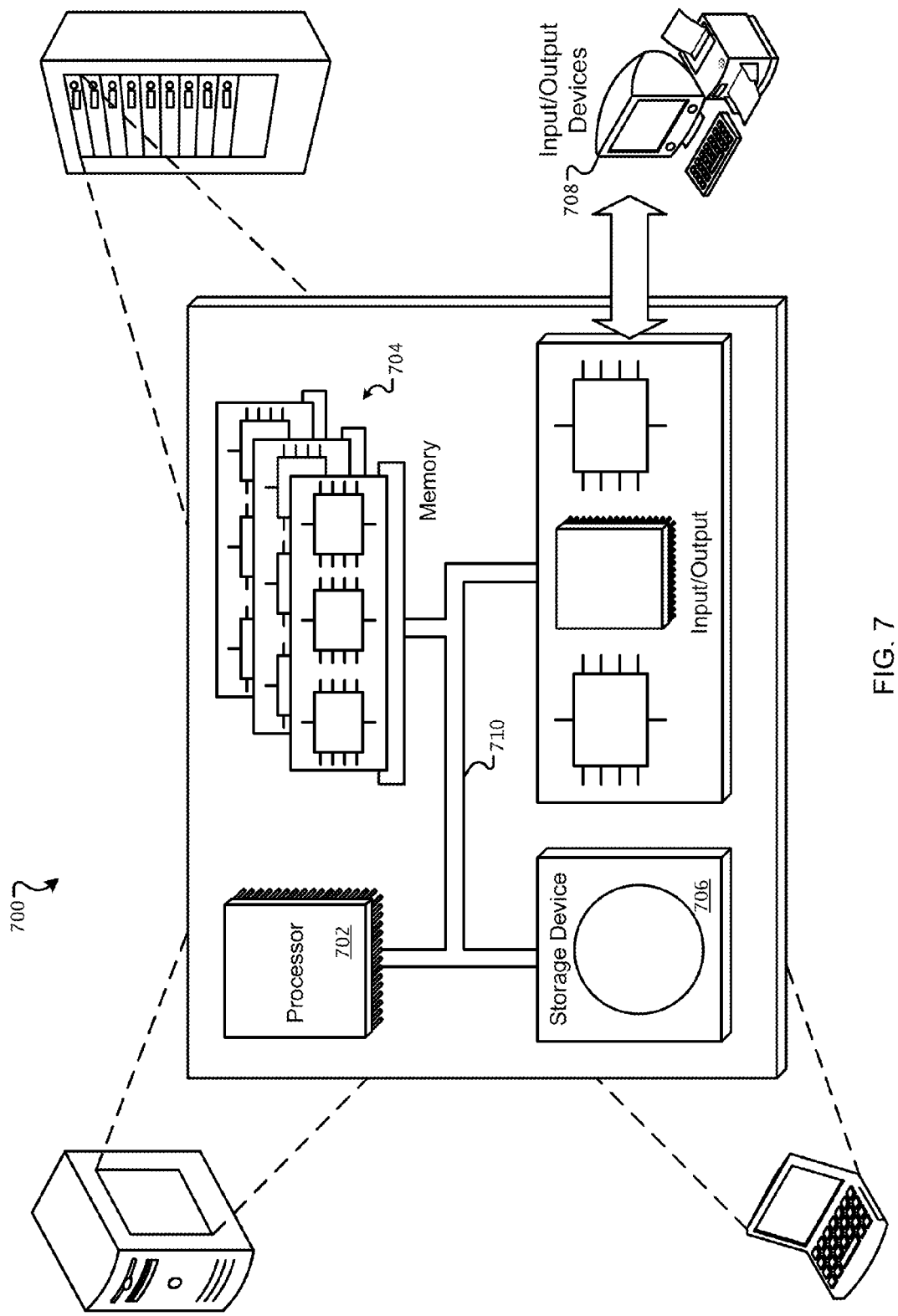
FIG. 7 is a schematic diagram of a generic computer system.

FIG. 7 is a schematic diagram of a generic computer system 700. The system 700 can be used for practicing operations described in association with the techniques described in the disclosure. The system 700 can include a processor 702, a memory 704, a storage device 706, and input/output devices 708. Each of the components 702, 704, 706, and 708 are interconnected using a system bus 710. The processor 702 is capable of processing instructions for execution within the system 700. Such executed instructions can implement one or more components of call control manager 130, for example. In one implementation, the processor 702 is a single-threaded processor. In another implementation, the processor 702 is a multi-threaded processor. The processor 702 is capable of processing instructions stored in the memory 704 or on the storage device 706 to display information for a user interface on the input/output device 708.

The memory 704 is a computer readable medium such as volatile or non-volatile memory that stores information within the system 700. The memory 704 could store data structures representing fraud evaluation objects and parameters, account configurations, system or account status, and so on, for example. The storage device 706 is capable of providing persistent storage for the system 700. The storage device 706 may be a floppy disk device, a hard disk device, an optical disk device, or a tape device, or other suitable persistent storage means. The input/output device 708 provides input/output operations for the system 700. In one implementation, the input/output device 708 includes a keyboard and/or pointing device. In another implementation, the input/output device 708 includes a display unit for displaying graphical user interfaces.

The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications can be made without departing from the spirit and scope of the invention. For example, the examples were given in C programming language. However, the programmable compiler can be implemented for any imperative computer programming language. Also, the function exp was given to illustrate the efficiency of a reduced accuracy routine. Other mathematical functions can be written to increase efficiency from the standard functions. Accordingly, other implementations are within the scope of the following claims.

A number of implementations of the invention have been described. Nevertheless, it will be understood that various modifications can be made without departing from the spirit and scope of the invention. Accordingly, other implementations are within the scope of the following claims.

What is claimed is:

1. A method comprising:
receiving a service request from a remote communications device associated with a service account, wherein the service request identifies a contact phone number for the service account;
validating the service request using one or more fraud evaluation processes, wherein the one or more fraud evaluation processes comprise a first fraud evaluation process, wherein validating the service request using the first fraud evaluation process comprises validating the contact phone number identified in the service request, and wherein validating the contact phone number identified in the service request comprises determining a count of other service accounts that are associated with the contact phone number;
determining a respective score for each of the fraud evaluation processes, wherein determining a respective score for each of the fraud evaluation processes comprises determining a score for the first fraud evaluation process based at least in part on the count of other service accounts associated with the contact phone number; and
evaluating the service request based on the respective scores.

2. The method of claim 1, wherein the service request is a request to activate or modify a telecommunications service account with a telecommunications service provider, and wherein evaluating the service request comprises evaluating the service request to determine whether to activate or modify the telecommunications service account based on the respective scores.

3. The method of claim 1, wherein validating the contact phone number identified in the service request further comprises:
placing a call to the contact phone number;
providing, during the call, a first verification code;
providing, for presentation on the remote communications device, a user interface for receiving an input of a second verification code;
receiving the input of the second verification code through the user interface; and
wherein determining the score for the first fraud evaluation process further comprises determining the score for the first fraud evaluation process based at least in part on whether the first verification code matches the second verification code.

4. The method of claim 1, wherein validating the contact phone number identified in the service request further comprises:
sending a message to the contact phone number that includes a first verification code;
providing, for presentation on the remote communications device, a user interface for receiving an input of a second verification code;
receiving the input of the second verification code through the user interface; and
wherein determining the score for the first fraud evaluation process further comprises determining the score for the first fraud evaluation process based at least in part on whether the first verification code matches the second verification code.

5. The method of claim 1, wherein validating the contact phone number identified in the service request further comprises:
determining a count of failed account activations associated with the contact phone number; and
wherein determining the score for the first fraud evaluation process further comprises determining the score for the first fraud evaluation process based at least in part on the count of failed account activations associated with the contact phone number.

6. The method of claim 1, wherein validating the contact phone number identified in the service request further comprises:
determining whether the contact phone number appears in a database of known phone numbers; and
wherein determining the score for the first fraud evaluation process further comprises determining the score for the first fraud evaluation process based at least in part on whether the contact phone number appears in a database of known phone numbers.

7. The method of claim 1, wherein validating the contact phone number identified in the service request further comprises:
verifying a device type associated with the contact phone number; and
wherein determining the score for the first fraud evaluation process further comprises determining the score for the first fraud evaluation process based at least in part on whether the device type associated with the contact phone number is an acceptable device type.

8. The method of claim 1, wherein evaluating the service request comprises:
combining the score associated with each fraud evaluation process to generate an overall score; and
determining whether the overall score is in a range of acceptable scores.

9. The method of claim 8, further comprising:
determining to deny the service request when the overall score is not in the range of acceptable scores; and
determining to allow the service request when the overall score is in the range of acceptable scores.

10. The method of claim 1, wherein the fraud evaluation processes include the first fraud evaluation process and a second fraud evaluation process, the method further comprising:
prioritizing each of the first and second fraud evaluation processes based on a predetermined criterion, and
executing the second fraud evaluation process only if an execution result associated with executing the first fraud evaluation process does not meet the predetermined criterion.

11. A non-transitory computer storage medium encoded with a computer program, the computer program comprising instructions that when executed by one or more computers cause the one or more computers to perform operations comprising:
- receiving a service request from a remote communications device associated with a service account, wherein the service request identifies a contact phone number for the service account;
- validating the service request using one or more fraud evaluation processes, wherein the one or more fraud evaluation processes comprise a first fraud evaluation process, wherein validating the service request using the first fraud evaluation process comprises validating the contact phone number identified in the service request, and wherein validating the contact phone number identified in the service request comprises determining a count of other service accounts that are associated with the contact phone number;
- determining a respective score for each of the fraud evaluation processes, wherein determining a respective score for each of the fraud evaluation processes comprises determining a score for the first fraud evaluation process based at least in part on the count of other service accounts associated with the contact phone number; and
- evaluating the service request based on the respective scores.

12. The computer storage medium of claim 11, wherein the service request is a request to activate or modify a telecommunications service account with a telecommunications service provider, and wherein evaluating the service request comprises evaluating the service request to determine whether to activate or modify the telecommunications service account based on the respective scores.

13. A system comprising one or more computers and one or more storage devices storing instructions that when executed by one or more computers cause the one or more computers to perform operations comprising:
- receiving a service request from a remote communications device associated with a service account, wherein the service request identifies a contact phone number for the service account;
- validating the service request using one or more fraud evaluation processes, wherein the one or more fraud evaluation processes comprise a first fraud evaluation process, wherein validating the service request using the first fraud evaluation process comprises validating the contact phone number identified in the service request, and wherein validating the contact phone number identified in the service request comprises determining a count of other service accounts that are associated with the contact phone number;
- determining a respective score for each of the fraud evaluation processes, wherein determining a respective score for each of the fraud evaluation processes comprises determining a score for the first fraud evaluation process based at least in part on the count of other service accounts associated with the contact phone number; and
- evaluating the service request based on the respective scores.

14. The system of claim 13, wherein the service request is a request to activate or modify a telecommunications service account with a telecommunications service provider, and wherein evaluating the service request comprises evaluating the service request to determine whether to activate or modify the telecommunications service account based on the respective scores.

15. The system of claim 13, wherein validating the contact phone number identified in the service request further comprises:
- determining a count of failed account activations associated with the contact phone number; and
- wherein determining the score for the first fraud evaluation process further comprises determining the score for the first fraud evaluation process based at least in part on the count of failed account activations associated with the contact phone number.

16. The system of claim 13, wherein validating the contact phone number identified in the service request further comprises:
- determining whether the contact phone number appears in a database of known phone numbers; and
- wherein determining the score for the first fraud evaluation process further comprises determining the score for the first fraud evaluation process based at least in part on whether the contact phone number appears in a database of known phone numbers.

17. A system comprising:
- means for receiving a service request from a remote communications device associated with a service account, wherein the service request identifies a contact phone number for the service account;
- means for validating the service request using one or more fraud evaluation processes, wherein the one or more fraud evaluation processes comprise a first fraud evaluation process, wherein validating the service request using the first fraud evaluation process comprises validating the contact phone number identified in the service request, and wherein validating the contact phone number identified in the service request comprises determining a count of other service accounts that are associated with the contact phone number;
- means for determining a respective score for each of the fraud evaluation processes, wherein determining a respective score for each of the fraud evaluation processes comprises determining a score for the first fraud evaluation process based at least in part on the count of other service accounts associated with the contact phone number; and
- means for evaluating the service request based on the respective scores.

18. The system of claim 17, wherein the service request is a request to activate or modify a telecommunications service account with a telecommunications service provider, and wherein evaluating the service request comprises evaluating the service request to determine whether to activate or modify the telecommunications service account based on the respective scores.

* * * * *